(12) United States Patent
Zhu et al.

(10) Patent No.: US 7,012,624 B2
(45) Date of Patent: Mar. 14, 2006

(54) TEXTURE SYNTHESIS FOR REPAIRING DAMAGED IMAGES

(75) Inventors: Yunfang Zhu, Zhejiang (CN); Huiqiong Wang, Zhejiang (CN); Yiqing Jin, Zhejiang (CN); Donghui Wu, Fremont, CA (US); Lingxiang Zhou, Fremont, CA (US)

(73) Assignee: ArcSoft, Inc., Fremont, CA (US)

( * ) Notice: Subject to any disclaimer, the term of this patent is extended or adjusted under 35 U.S.C. 154(b) by 108 days.

(21) Appl. No.: 10/748,419

(22) Filed: Dec. 29, 2003

(65) Prior Publication Data

US 2005/0146539 A1   Jul. 7, 2005

(51) Int. Cl.
G09G 5/00   (2006.01)

(52) U.S. Cl. ............... 345/639; 345/582; 382/254; 358/453

(58) Field of Classification Search ............... 345/619, 345/639, 582, 606; 382/298, 300, 254, 163, 382/280, 283; 358/452, 453, 462, 463
See application file for complete search history.

(56) References Cited

U.S. PATENT DOCUMENTS 5,974,194 A * 10/1999 Hirani et al. ............... 382/262
6,587,592 B1 * 7/2003 Georgiev et al. ........... 382/254
6,658,166 B1 * 12/2003 Zlotnick et al. ............ 382/282

OTHER PUBLICATIONS

M. Bertalmio, G. Sapior, V. Caselles, and C. Ballester, "Image Inpainting," Computer Graphics, Proceedings of SIGGRAPH, New Orleans, Jul. 2000, pp. 417-424.
T. Chang, A. Marquina, and P. Mulet, "High Order Total Variation-Based Image Restoration," SIAM Journal on Scientific Computing, vol. 22, No. 2, 2000, pp. 503-516.
C. Ballester, M. Bertalmio, V. Caselles, G. Sapiro, and J. Verdera, "Filling-In by Joint Interpolation of Vector Fields and Gray Levels," University of Minnesota IMA TR, Apr. 2000.
A. Efros and T. Leung, "Texture Synthesis by Non-parametric Sampling," Proceedings of International Conference on Computer Vision, 1999.
L. Liang, CE Liu, Y. Xu, B. Guo, and H. Shum, "Real-Time Texture Synthesis by Patch-Based Sampling," Microsoft Research Technical Report MSR-TR-2001-40, Mar. 2001.
E. Reinhard, M. Ashikhimin, B. Gooch, and P. Shirley, "Color Transfer between Images," IEEE Computer Graphics and Applications, vol. 21, No. 5, Sep./Oct. 2001, pp. 34-41.
Guoliang Fan, "Wavelet Domain Statistical Image Modeling and Processing," Ph.D. Dissertation, University of Delaware, May 22, 2001.
J. DeBonet, "Multiresolution Sampling Procedure for Analysis and Synthesis of Texture Images," in Proceedings of the 24th Annual Conference on Computer Graphics and Interactive Techniques, 1997, pp. 361-368.

* cited by examiner

*Primary Examiner*—Richard Hjerpe
*Assistant Examiner*—Jonathan Liou
(74) *Attorney, Agent, or Firm*—Patent Law Group LLP; David C. Hsia (57) ABSTRACT

A method for generating texture includes (1) selecting a target patch to be filled in a image, (2) selecting a sample patch as a candidate for filling the target patch, (3) determining a first difference between a first area surrounding the target patch and a corresponding first area surrounding the sample patch, and a second difference between a second area surrounding the target patch and a corresponding second area surrounding the sample patch, (4) multiplying a larger of the first difference and the second difference with a first weight factor, and a smaller of the first difference and the second difference with a second weight factor, and (5) summing the weighted first difference and the weighted second difference as a distance between the target patch and the sample patch.

12 Claims, 4 Drawing Sheets

TEXTURE SYNTHESIS FOR REPAIRING DAMAGED IMAGES

FIELD OF INVENTION

This invention relates to software for image inpainting and texture synthesis.

DESCRIPTION OF RELATED ART

Damaged images can be repaired by professional artists using a technique called inpainting. Various software inpainting techniques have been developed to undetectably repair images like professional artists. Bertalmio et al. proposes a method based on information propagation. M. Bertalmio, G. Sapiro, V. Caselles, and C. Ballester, "Image Inpainiting," Computer Graphics, Proceedings of SIG-GRAPH, pp. 417–424, New Orleans, July 2000. It takes the known gray values of the points in the boundary of the damaged areas and propagates these gray values to the damaged area along the direction which has a small gradient. Chan et al. proposes a method that repairs image by solving the Partial Differential Equation (PDE). T. Chan, A. Marquina, and P. Mulet, "High-Order Total Variation-Based Image Restoration," SIAM Journal on Scientific Computing, pp. 503–516, Vol. 22, No. 2, 2000.

Many damaged images look fine after being repaired by the aforementioned inpainting methods. However, these methods have a common shortcoming: all of them cannot retrieve the texture information of the image. This shortcoming is not very obvious when only a small area of the image is damaged. When a large area of the image is damaged, the result looks blurry without texture information and can be easily detected by the human eyes.

Texture synthesis methods can also repair damaged images, such as non-parametric sampling that creates texture using a Markov random fields (MRF) model. In the MRF model, the conditional Probability Distribution Function (PDF) of a point is calculated by using the neighbor points. The information of the damaged point is duplicated from a point which has the same conditional probability distribution. Efros et al. proposes a method that duplicates the information point by point. A. Efros and T. Leung, "Texutre Synthesis by Non-parametric Sampling," In Proceedings of International Conference on Computer Vision, 1999. Liang et al. proposes a method based on patches (i.e., blocks). L. Liang, C E Liu, Y. Xu, B. Guo, and H. Shum, "Real-Time Texture Synthesis by Patch-Based Sampling," Microsoft Research Technical Report MSR-TR-2001-40, March 2001.

The aforementioned texture synthesis methods can repair pure texture images well. However, the actual images in practice (such as natural images) often do not have features with repetitive texture. Furthermore, the texture features of these images are complicated by their environment such as lighting. Repairing images using the aforementioned texture synthesis methods without addressing these problems will not produce a satisfactory result.

Thus, what is needed is a method for repairing damaged images that addresses the shortcomings of the conventional inpainting and texture synthesis methods.

BRIEF DESCRIPTION OF THE DRAWINGS

Use of the same reference numbers in different figures indicates similar or identical elements.

SUMMARY

In one embodiment of the invention, a method for generating texture includes (1) selecting a target patch to be filled in an image, (2) selecting a sample patch as a candidate for filling the target patch, (3) determining a first difference between a first area surrounding the target patch and a corresponding first area surrounding the sample patch, and a second difference between a second area surrounding the target patch and a corresponding second area surrounding the sample patch, (4) multiplying a larger of the first difference and the second difference with a first weight factor, and a smaller of the first difference and the second difference with a second weight factor, and (5) summing the weighted first difference and the weighted second difference as a distance between the target patch and the sample patch.

DETAILED DESCRIPTION

Problems of a Conventional Patched-based Sampling Algorithm

Figure 1A:
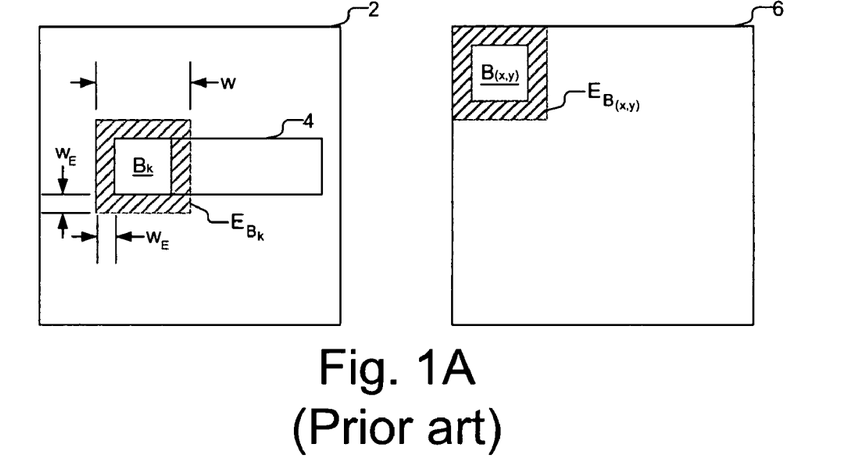
FIGS. 1A, 1B, 2A, 2B, and 2C illustrate a conventional patch-based sampling algorithm.

Liang et al. discloses a patch-based sampling algorithm for synthesizing textures from a sample. This sampling algorithm is hereafter explained in reference to FIG. 1A where an image 2 has a target area 4 to be filled with textures from a sample texture 6. Target area 4 is divided into target patches $B_k$ having a patch size of w by w (only one is labeled for clarity), where k is a variable. If the width or the height of target area 4 is not a multiple of w, the size of the last row and the last column of target patches is defined as:

$$w * w_1, w_2 * w, \quad (1)$$

$$w_1 = W \bmod w, w_2 = H \bmod w, \quad (2)$$

where W and H express the width and height of the target area, respectively, and mod is the function that calculates the residual of W or H divided by w.

Each target patch $B_k$ includes a boundary zone $E_{B_k}$ having a width $w_E$ surrounding the target patch. Boundary zone $E_{B_k}$ includes known texture from image 2 and derived texture from filling in other surrounding target patches with textures from sample texture 6.

Sample texture 6 is divided into sample patches $B_{(x,y)}$ (only one is labeled for clarity), where (x,y) denotes the left-lowest point of the sample patch. Sample patches $B_{(x,y)}$ and target patches $B_k$ have the same size. Each sample patch $B_{(x,y)}$ includes a boundary zone $E_{B_{(x,y)}}$ surrounding the sample patch.

The corresponding points in boundary zones $E_{B_{(x,y)}}$ and $E_{B_k}$ are compared to determine if a sample patch $B_{(x,y)}$ matches a target patch $B_k$. If the distance (i.e., the difference) between the sample patch $B_{(x,y)}$ and the target patch $B_k$ is less than a prescribed threshold, then that sample patch $B_{(x,y)}$ is placed in a set $\psi_B$. The definition of set $\psi_B$ is:

$$\psi_B = \{B_{(x,y)} | d(E_{B_k}, E_{B_{(x,y)}}) < d_{max}\}, \quad (3)$$

where d is the distance between boundary zones $E_{B_{(x,y)}}$ and $E_{B_k}$ of sample patch $B_{(x,y)}$ and target patch $B_k$, respectively, and $d_{max}$ is the prescribed threshold. The definition of distance d between boundary zones $E_{B_k}$ and $E_{B_{(x,y)}}$ is:

$$d(E_{B_k}, E_{B_{(x,y)}}) = \left[\frac{1}{A}\sum_{i=1}^{A}(p^i_{B_k} - p^i_{out})^2\right]^{1/2}, \quad (4)$$

where A is the number of corresponding points in boundary zones $E_{B_{(x,y)}}$ and $E_{B_k}$, and $p^i_{B_k}$ and $p^i_{B_{(x,y)}}$ denote the corresponding gray values of the corresponding points.

After all the sample patches $B_{(x,y)}$ in sample texture 6 are compared with a target patch $B_k$, then a sample patch $B_{(x,y)}$ is randomly selected from set $\psi_B$ and used to fill target patch $B_k$. If set $\psi_B$ is empty, then a sample patch $B_{(x,y)}$ with the smallest distance is selected to fill target patch $B_k$. This process is repeated for each target patch $B_k$ in target area 4 of image 2.

Figure 1B:
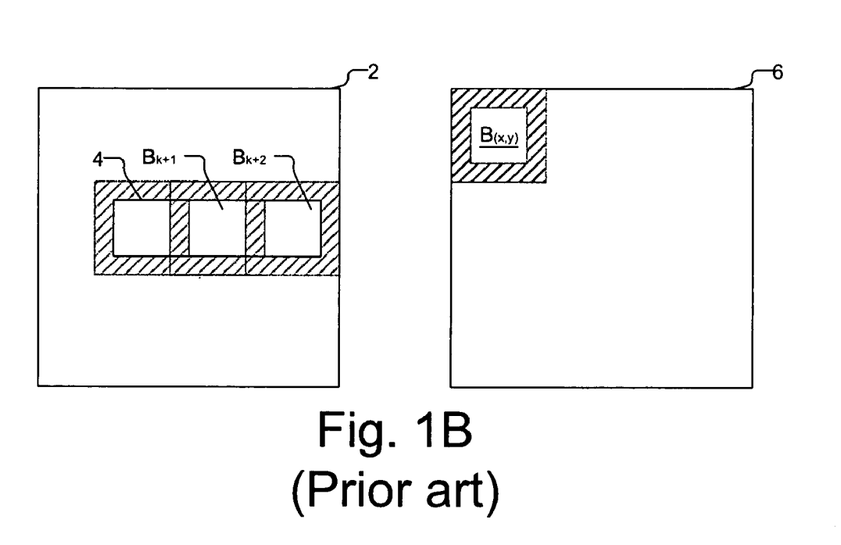

After filling in one target patch, the texture of that target patch becomes part of the known boundary zones of adjacent target patches. For example in FIG. 1B, a right area of a boundary zone $E_{B_{k+1}}$ from a target patch $B_{k+1}$ becomes a known left area of a boundary zone $E_{B_{k+2}}$ from a target patch $B_{k+2}$. After sample patches fill in the target patches, the overlapping areas of their boundary zones are blended.

Figure 2A:
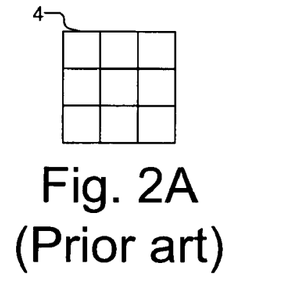
Figure 2B:
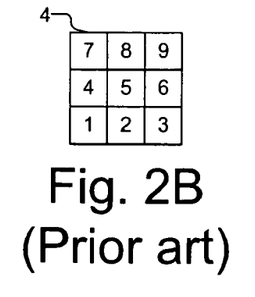
Figure 2C:
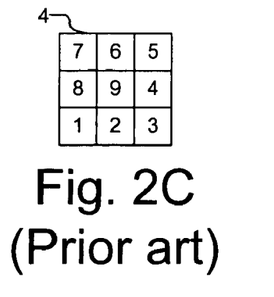

FIG. 2A illustrates a target area 4 divided into nine target patches. As described above, the target patches can be filled one by one. FIG. 2B illustrates one order in which the target patches are filled in row by row. FIG. 2C illustrates one order in which the target patches are filled by an inward spiral order.

One disadvantage of Liang et al. is that formula 4 applies the same weight to all the areas that make up the boundary zones. For example, assuming a target patch having a boundary zone with known left and lower areas is compared with a sample patch having a boundary zone with a very similar or the same left area. The distance calculated may be smaller than the prescribed threshold because of the similarity between the left areas around the target and the sample patches even though the lower areas around the target and the sample patches are very different. When such a sample patch is used to fill the target patch, the lower portion of the sample patch may be greatly visible in the image. Furthermore, the selection of this sample patch will affect the subsequent target patches that are filled as the dissimilarity is propagated through subsequent matching operations.

Another disadvantage of Liang et al. is that it fails to compensate for asymmetrical lighting. Asymmetrical lighting in an image will give different gray values to the same texture. This makes it difficult to fill a target area with the proper texture because areas with similar gray values may have different textures while areas with the same texture may have different gray values. When a sample patch is pasted directly onto a target patch, then the sample patch may be visible in the image.

Improvement to the Patched-based Sampling Algorithm

Figure 3:
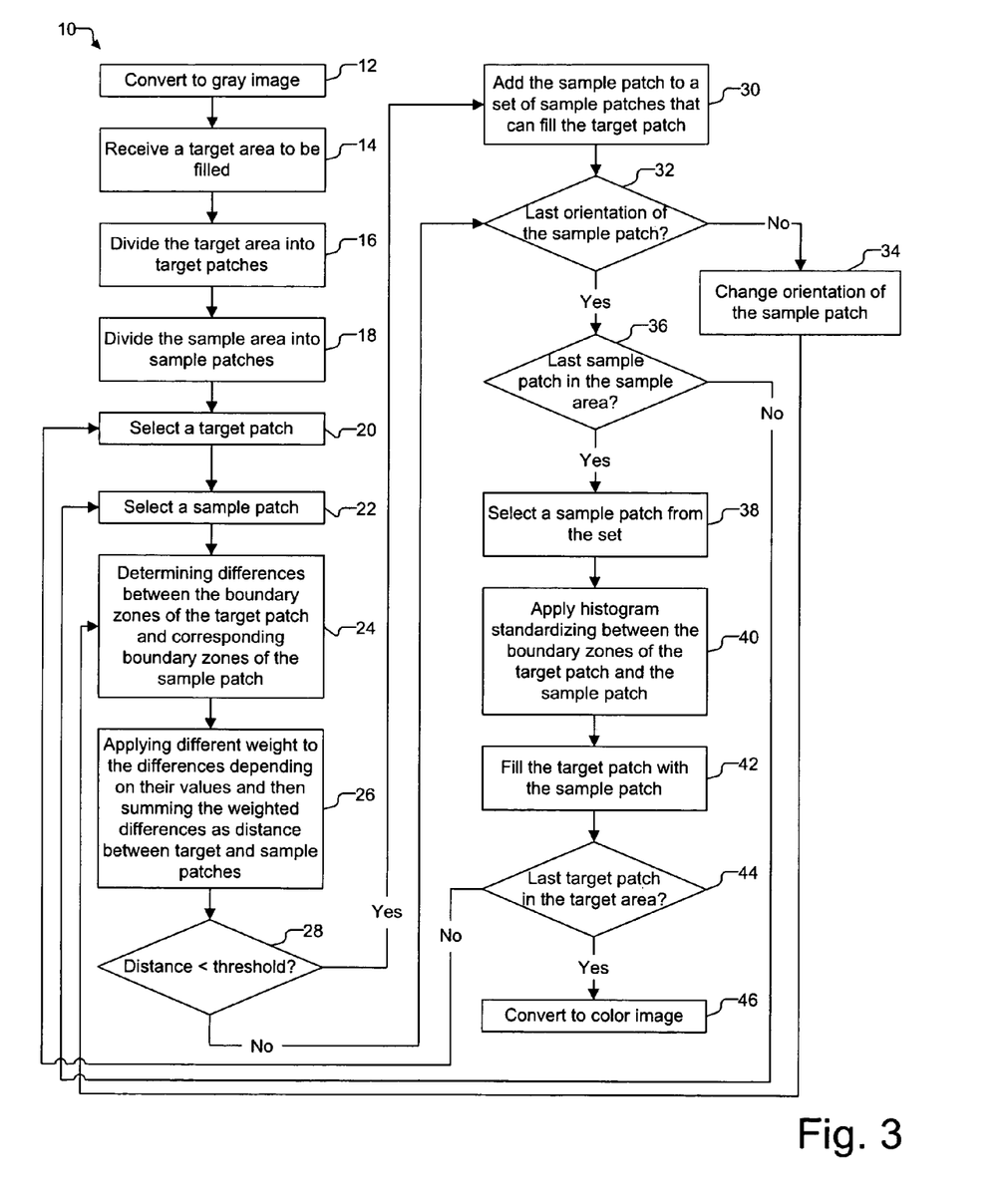
FIG. 3 illustrates a method for filling an image in one embodiment of the invention.
Figure 4:
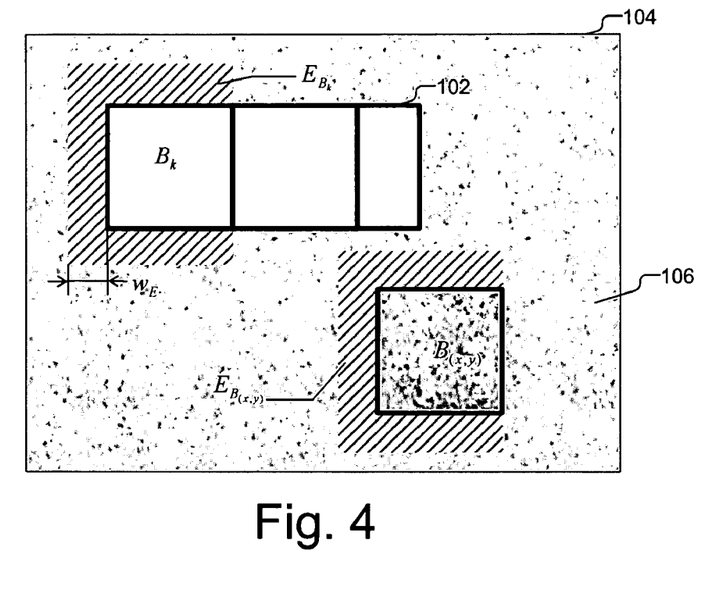
FIGS. 4 and 6 illustrate the filling of an area in an image with a sample patch in one embodiment of the invention.

FIG. 3 illustrates a method 10 for filling a target area 102 (FIG. 4) in an image 104 (FIG. 4) with textures from a sample area 106 (FIG. 4) in one embodiment of the invention. Target area 102 may be a damaged area that needs to be repaired while sample area 106 may be any undamaged area outside of target area 102 in image 104. Alternatively, sample area 106 can be another image or a group of sample patches. Method 10 can be implemented with software on a computer or any equivalents thereof.

In step 12, the computer optionally converts image 104 from a color image into a gray scale image. The computer can convert the color values into gray scale values as follows:

$$I(x, y) = \frac{R(x, y) + G(x, y) + B(x, y)}{3}, \quad (5)$$

where I is the gray value of a point, and R, G, B are the color values of the point. This step may help to speed up the processing later described. Step 12 can be skipped if image 104 is a gray scale image from the start.

In step 14, the computer receives a target area 102 to be filled. Typically, target area 102 is designated by a user after the user visually inspects image 104.

In step 16, the computer divides target area 102 into target patches $B_k$ with associated boundary zones $E_{B_k}$.

In step 18, the computer divides sample area 106 into target patches $B_{(x,y)}$ with associated boundary zones $E_{B_{(x,y)}}$.

In step 20, the computer selects a target patch $B_k$ from target area 102 to be matched with a sample patch. In one embodiment, the computer selects the target patch in an inward spiral order.

In step 22, the computer selects a sample patch $B_{(x,y)}$ from sample area 106 to be compared with target patch $B_k$.

Figure 5:
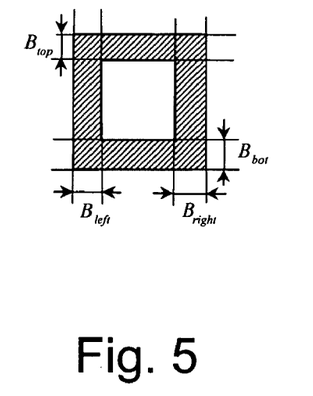
FIG. 5 illustrates a boundary zone of a patch divided into individual boundary areas in one embodiment of the invention.

In steps 24 and 26, the computer determines the distance between the current target patch $B_k$ and the current sample patch $B_{(x,y)}$. Specifically, in step 24, the computer determines the difference between the corresponding points in boundary zones $E_{B_k}$ and $E_{B_{(x,y)}}$. Unlike Liang et al., the computer divides the boundary zones into boundary areas and then determine the differences between the corresponding boundary areas as follows:

$$d_n = \left[\frac{1}{A_n}\sum_{i=1}^{A_n}(p^i_{B_i} - p^i_{B_{(x,y)}})^2\right]^{1/2}, \quad 2 \leq n \leq 4, \quad (6)$$

where $d_n$ is the difference of the nth pair of corresponding boundary areas in boundary zones $E_{B_k}$ and $E_{B_{(x,y)}}$, $A_n$ is the number of corresponding points in the nth pair of corresponding boundary areas, and $p^i_{B_k}$ and $p^i_{B_{(x,y)}}$ denote the corresponding gray values of the corresponding points. In one embodiment, the computer divides each boundary zone into a top boundary area $B_{top}$, a left boudnary area $B_{left}$, a bottom boundary area $B_{bot}$, and a right boundary area $B_{right}$ as shown in FIG. 5. Note that the four corners are part of two boundary areas and will be calculated twice in equation 6.

In step 26, the computer weighs the differences of the corresponding areas and then sums the weighted differences as follows:

$$d = \sum_{i=1}^{n}\alpha_i d_i, \quad 0 < \alpha_i \leq 1, \quad (7)$$

where d is the distance between target patch $B_k$ and sample patch $B_{(x,y)}$, $d_i$ is the difference of the ith pair of corresponding boundary areas in a descending sequence, $\alpha_i$ is the weight given to difference $d_i$, and n is the total number of corresponding boundary areas. The value of $\alpha_i$ is determined by boundary width $w_E$ and patch size w (where patch size w is typically determined by the size of the smallest repeated unit of texture known as textone, and $w_E$ is typically $$\left(\frac{1}{5} \sim \frac{1}{4}\right)w\right).$$

In one embodiment, value of $\alpha_i$ is determined as follows:

$$\alpha_i = \frac{1}{\text{sequence}(d_i)}, \quad (8)$$

where the sequence is the descending sequence of the distances from the biggest to the smallest. Equation 8 thus gives different weights to different boundary areas, and the boundary area with the biggest distance has the weight 1.

In step 28, the computer determines if the distance between the current target patch $B_k$ and the current sample patch $B_{(x,y)}$ is less than a prescribed threshold. If so, then step 28 is followed by step 30. Otherwise, step 28 is followed by step 32.

In step 30, the computer puts the current sample patch $B_{(x,y)}$ in a set $\psi_B$, which contains all the sample patches that can be used to fill target patch $B_k$.

In step 32, the computer determines if all the orientations of the current sample patch $B_{(x,y)}$ have been compared with the current target patch $B_k$. This is because image 102 may have symmetrical areas, caused by reflection or other reasons, that can provide a good match for a target patch. Thus, different orientations of the current sample patch $B_{(x,y)}$ are also compared for an acceptable match with the current target patch $B_k$. In one embodiment, the current sample patch $B_{(x,y)}$ is orthogonally rotated three times from its original orientation to see if any of the other orientations provide an acceptable match with the current target patch $B_k$. If all the orientations of the current sample patch $B_{(x,y)}$ have been tried, then step 32 is followed by step 36. Otherwise step 32 is followed by step 34.

In step 34, the computer rotates the current sample patch $B_{(x,y)}$. Step 34 is followed by step 24 and the newly rotated sample patch $B_{(x,y)}$ is compared with the current target patch $B_k$. Method 10 repeats this loop until all the orientations of the current sample patch $B_{(x,y)}$ have been compared to the current target patch $B_k$.

In step 36, the computer determines if the last sample patch $B_{(x,y)}$ in sample area 106 has been compared with the current target patch $B_k$. If so, then step 36 is followed by 38. Otherwise step 36 is followed by step 22 and another sample patch $B_{(x,y)}$ is selected. Method 10 thus repeats this loop until all the sample patches $B_{(x,y)}$ in sample area 106 have been compared to the current target patch $B_k$.

In step 38, the computer randomly selects a sample patch $B_{(x,y)}$ from set $\psi_B$ to fill the current target patch $B_k$. If set $\psi_B$ is empty, then the computer selects the sample patch $B_{(x,y)}$ with the smallest distance to fill the current target patch $B_k$.

In step 40, the computer adjusts the gray values of sample block $B_{(x,y)}$ to make them look natural with the boundary values of the current target patch $B_k$ and at the same time keep their texture features. Assume an image g is the selected sample patch and an image f is the boundary around the current target patch. It is desired to generate a new sample patch u that has the same texture features as selected sample patch g (i.e., have the same color gradient) and has the same color at its boundary f.

In order to keep the gradient of the selected sample patch g, the new sample patch u should satisfy the functions:

$$\frac{\partial u}{\partial x} = \frac{\partial g}{\partial x}, \quad (9)$$
$$\frac{\partial u}{\partial y} = \frac{\partial g}{\partial y}$$

where $$\frac{\partial u}{\partial x}$$

is the gradient of the new sample patch u in x direction at point (x,y), $$\frac{\partial u}{\partial y}$$

is the gradient of the new sample patch u in y direction at point (x,y), $$\frac{\partial g}{\partial x}$$

is the gradient of the selected sample patch g in x direction at point (x,y), and $$\frac{\partial g}{\partial y}$$

is the gradient of the selected sample patch g in y direction at point (x,y). Equation 9 can be rewritten as:

$$\begin{matrix}\left(\frac{\partial u}{\partial x} - \frac{\partial g}{\partial x}\right)^2 = 0 \\ \left(\frac{\partial u}{\partial y} - \frac{\partial g}{\partial y}\right)^2 = 0\end{matrix} \Leftrightarrow \left(\frac{\partial u}{\partial x} - \frac{\partial g}{\partial x}\right)^2 + \left(\frac{\partial u}{\partial y} - \frac{\partial g}{\partial y}\right)^2 = 0. \quad (10)$$

In order to make the new sample patch u have the same color at its boundary area f, the new sample patch u should satisfy the function:

$$u = f \quad (11)$$

Equation 11 can be rewritten as:

$$u = f \Leftrightarrow (u-f) = 0 \Leftrightarrow (u-f)^2 = 0. \quad (12)$$

Equations 10 and 12 can be combined into a single equation as follows:

$$(u-f)^2 = 0 \quad (13)$$
$$\left(\frac{\partial u}{\partial x} - \frac{\partial g}{\partial x}\right)^2 + \left(\frac{\partial u}{\partial y} - \frac{\partial g}{\partial y}\right)^2 = 0 \Leftrightarrow$$
$$(u-f)^2 + \left(\frac{\partial u}{\partial x} - \frac{\partial g}{\partial x}\right)^2 + \left(\frac{\partial u}{\partial y} - \frac{\partial g}{\partial y}\right)^2 = 0,$$

In other words, the new sample patch u should satisfy the equation 13 at point (x,y). Satisfying these conditions for the entire new sample patch u, equation 13 is rewritten as:

$$\sum_{x \in \Omega} \sum_{y \in \Omega} \left(\frac{\partial u}{\partial x} - \frac{\partial g}{\partial x}\right)^2 + \left(\frac{\partial u}{\partial y} - \frac{\partial g}{\partial y}\right)^2 + (u-f)^2 = 0. \quad (14)$$

where Ω is the area to be pasted with the new sample patch u. If equation 14 is written in continuous form, it becomes:

$$\int_\Omega \left(\left(\frac{\partial u}{\partial x} - \frac{\partial g}{\partial x}\right)^2 + \left(\frac{\partial u}{\partial y} - \frac{\partial g}{\partial y}\right)^2 + (u-f)^2\right) dx dy = 0. \quad (15)$$

As there is no solution of the new sample patch u that satisfies equation 15, the closest solution for the new sample patch u is determined by defining a function J(u) as follows:

$$J(u) = \quad (16)$$
$$\int_\Omega \left(\left(\frac{\partial u}{\partial x} - \frac{\partial g}{\partial x}\right)^2 + \left(\frac{\partial u}{\partial y} - \frac{\partial g}{\partial y}\right)^2\right) d(x,y) + \lambda \int_\Omega (u-f)^2 d(x,y),$$

where λ is the weight given between satisfying the boundary condition against satisfying the gradient condition, and d(x,y) is dxdy. Conventional minimizing methods, such as the Steepest Descent and Iteration, can be used to minimize function J(u).

Figure 6:
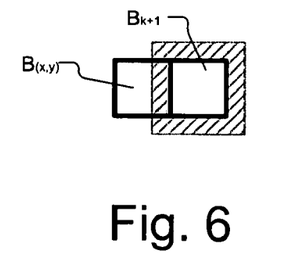

In step 42, the computer fills the current target patch $B_k$ with the adjusted sample patch $B_{(x,y)}$. Unlike Liang et al., where the boundary zone of the sample patch is also filled in to overlap with the known areas outside of the target patch and the areas derived from the filling of other target patches, the computer only fills in the selected sample patch $B_{(x,y)}$ without its boundary zone $E_{B(x,y)}$ into the current target patch $B_k$. As shown in FIG. 6, any area within the selected sample patch $B_{(x,y)}$ can become the boundary zone of another target patch $B_{k+1}$ to be filled. Specifically, part of sample patch $B_{(x,y)}$ becomes a left area $B_{left}$ of boundary zone $E_{B_{k+1}}$ of target batch $B_{k+1}$.

In step 44, the computer determines if the current target patch $B_k$ is the last target patch in target area 102. If so, then step 44 is followed by step 46. Otherwise step 44 is followed by step 20 and another target patch $B_k$ is selected. Method 10 thus repeats this loop until all the target patches $B_k$ in target area 102 have been filled.

In step 46, the computer optionally converts image 102 from a gray scale image into a color image. In one embodiment, the computer imposes the color characteristics of the original color image 102 onto the gray scale image 102 using the method disclosed by Reinhard et al. E. Reinhard, M. Ashikhmin, B. Gooch, P. Shirley, "Color Transfer between Images," IEEE Computer Graphics and Applications, Vol. 21, No. 5, September/October 2001.

As described above, method 10 provides many improvements over the conventional patched-based sampling algorithm disclosed by Liang et al. First, method 10 weighs the different areas of the boundary zones differently when calculating the distance between a sample patch and a target patch. Second, method 10 adjusts the gray values of the sample patch to better match the target patch. Third, method 10 compares the sample patch at various orientations to better match the target patch. Fourth, method 10 converts color images to gray scale images to improve processing speed.

Figure 7A:
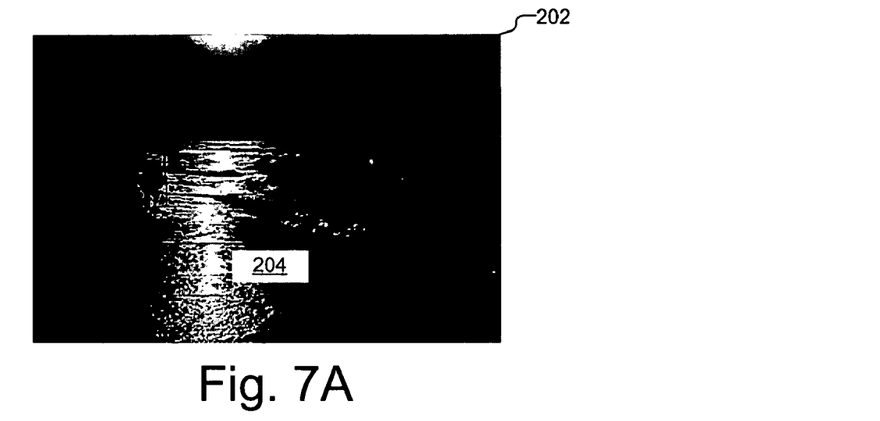
FIGS. 7A, 7B, and 7C illustrate the improvement of the method of FIG. 3 over the conventional patch-based sampling algorithm.
Figure 7B:
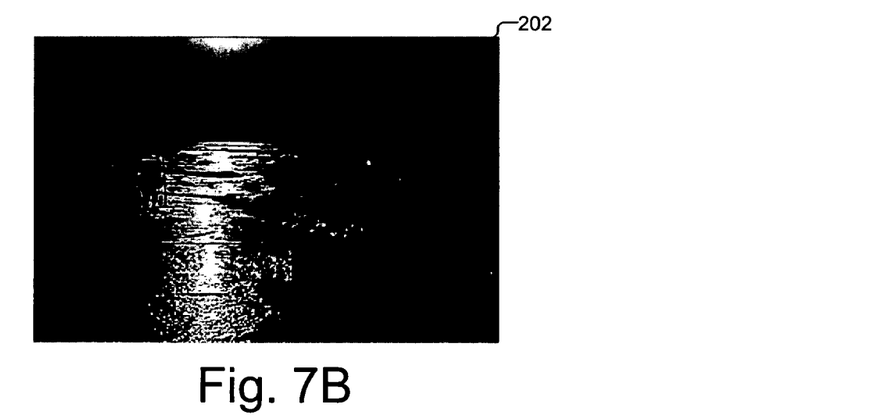
Figure 7C:
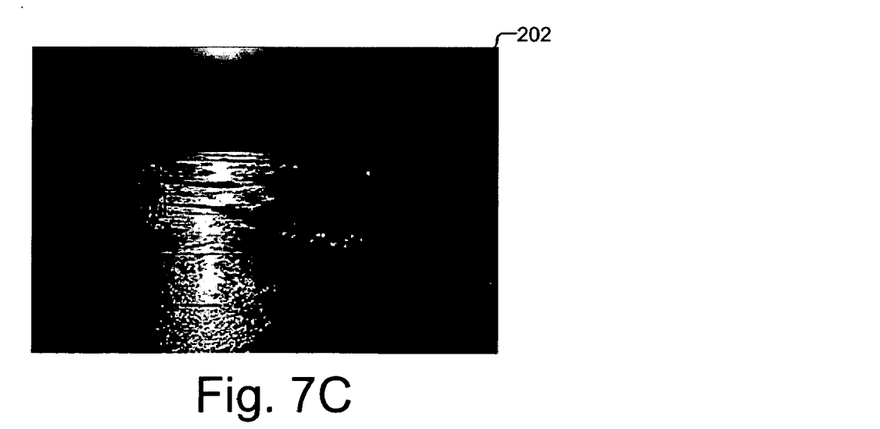

FIG. 7A illustrates an image 202 having a target area 204 to be filled with texture from a sample area within image 202 but outside of target area 204. FIG. 7B illustrates image 202 after it has been filled by the conventional patched-based sampling algorithm disclosed by Liang et al. A patch size of 20*20 pixels and a boundary width of 4 pixels were used. A 600*400 pixels image 202 and a 100*40 pixels target area 204 were used. As the figure shows, the filled area is still visible to the human eyes. FIG. 7C illustrates image 202 after it has been filled by method 10 (FIG. 3) using the above parameters in one embodiment of the invention. As the figure shows, the filled area is not visible to the human eyes.

Various other adaptations and combinations of features of the embodiments disclosed are within the scope of the invention. Numerous embodiments are encompassed by the following claims.

What is claimed is:

1. A method, comprising:
   selecting a target patch to be filled in an image;
   selecting a sample patch as a candidate for filling the target patch;
   determining a first difference between a first area surrounding the target patch and a corresponding first area surrounding the sample patch, and a second difference between a second area surrounding the target patch and a corresponding second area surrounding the sample patch;
   multiplying a larger of the first difference and the second difference with a first weight factor, and a smaller of the first difference and the second difference with a second weight factor; and
   summing the weighted first difference and the weighted second difference as a distance between the target patch and the sample patch.

2. The method of claim 1, wherein the sample patch is selected from the image.

3. The method of claim 1, wherein said determining a first difference and said determining a second difference comprise:

$$d_n = \left[\frac{1}{A_n} \sum_{i=1}^{A_n} \left(p^i_{B_i} - p^i_{B_{(x,y)}}\right)^2\right]^{1/2},$$

where $d_n$ is the difference of an nth pair of corresponding areas, $A_n$ is the number of corresponding points in the nth pair of corresponding areas, and $p^i_{B_k}$ and $p^i_{B_{(x,y)}}$ are the corresponding gray values of the corresponding points in the target patch and the sample patch, respectively.

4. The method of claim 3, wherein said multiplying and said summing comprise:

$$d = \sum_{i=1}^{n} \alpha_i d_i,$$

$$\alpha_i = \frac{1}{\text{sequence}(d_i)},$$

where d is the distance between the target patch and the sample patch, $d_i$ is the difference of the ith pair of corresponding boundary areas in a descending sequence, $\alpha_i$ is the weight given to the difference $d_i$, and n is the total number of corresponding boundary areas.

5. The method of claim 1, further comprising:
adjusting pixel values of the sample patch to match the first and the second areas surrounding the target patch; and
filling the target patch with the adjusted sample patch.

6. The method of claim 5, wherein said adjusting values of the sample patch comprises determining an adjusted sample patch that minimizes the following equation:

$$J(u) = \int_\Omega \left( \left( \frac{\partial u}{\partial x} - \frac{\partial g}{\partial x} \right)^2 + \left( \frac{\partial u}{\partial y} - \frac{\partial g}{\partial y} \right)^2 \right) d(x,y) + \lambda \int_\Omega (u-f)^2 d(x,y),$$

where u is the adjusted sample patch, g is the sample patch, f includes the first and the second areas, $\Omega$ is an area to be filled with the adjusted sample patch u, $$\frac{\partial u}{\partial x}$$

is a gradient of the adjusted sample patch u in x direction at point (x,y), $$\frac{\partial u}{\partial y}$$

is a gradient of the adjusted sample patch u in y direction at point (x,y), $$\frac{\partial g}{\partial x}$$

is a gradient of the sample patch g in x direction at point (x,y), and $$\frac{\partial g}{\partial y}$$

is a gradient of the sample patch image g in y direction at point (x,y), and $\lambda$ is a weight factor.

7. The method of claim 1, further comprising:
rotating the sample patch;
determining another first difference between the first area surrounding the target patch and another corresponding first area surrounding the sample patch after said rotating, and another second difference between the second area surrounding the target patch and another corresponding second area surrounding the sample patch after said rotating;
multiplying the larger of said another first difference and said another second difference with the first weight factor, and the smaller of said another first difference and said another second difference with the second weight factor;
summing the weighted another first difference and the weighted another second difference as another distance between the target patch and the sample patch after said rotating.

8. The method of claim 7, further comprising:
if the distance between the target patch and the sample patch is less than a threshold, saving the sample patch in a set of sample patches that can be used fill the target patch;
if said another distance between the target patch and the sample patch after said rotating is less than the threshold, saving said another sample patch in the set of sample patches that can be used fill the target patch; and
selecting one sample patch from the set of sample patches and filling the target patch with said one sample patch.

9. The method of claim 1, further comprising, prior to said selecting a target patch, said selecting a sample patch, said determining, said multiplying, and said summing:
converting the image from color to gray.

10. The method of claim 9, further comprising, after said converting the image from color to gray, said selecting a target patch, said selecting a sample patch, said determining, said multiplying, and said summing:
converting the filled image from gray to color.

11. The method of claim 1, further comprising:
if the distance between the target patch and the sample patch is less than a threshold, saving the sample patch in a set of sample patches that can be used fill the target patch;
selecting another sample patch and repeating said determining, said multiplying, and said summing for said another sample patch to determine another distance between the target patch and said another sample patch;
if said another distance between the target patch and said another sample patch is less than the threshold, saving said another sample patch in the set of sample patches that can be used fill the target patch; and
selecting one sample patch from the set of sample patches and filling the target patch with said one sample patch.

12. A method, comprising:
selecting a target patch to be filled in the image;
selecting a sample patch as a candidate for filling the target patch;
determining a first difference between a first area surrounding the target patch and a corresponding first area surrounding the sample patch, and a second difference between a second area surrounding the target patch and a corresponding second area surrounding the sample patch;
multiplying a larger of the first difference and the second difference with a first weight factor, and a smaller of the first difference and the second difference with a second weight factor;
summing the weighted first difference and the weighted second difference as a distance between the target patch and the sample patch;

if the distance between the target patch and the sample patch is less than a threshold, saving the sample patch in a set of sample patches that can be used fill the target patch;

selecting another sample patch and repeating said determining, said multiplying, and said summing for said another sample patch to determine another distance between the target patch and said another sample patch;

if said another distance between the target patch and said another sample patch is less than the threshold, saving said another sample patch in the set of sample patches that can be used fill the target patch;

selecting one sample patch from the set of sample patches;

adjusting pixel values of the selected sample patch to match the first and the second areas surrounding the target patch; and filling the target patch with the adjusted sample patch.

* * * * *